United States Patent
Cooley et al.

(10) Patent No.: US 8,073,474 B1
(45) Date of Patent: Dec. 6, 2011

(54) SYSTEMS AND METHODS FOR CONTROLLING GROUP MESSAGING

(75) Inventors: James W. Cooley, Seattle, WA (US); Neal E. Tucker, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 981 days.

(21) Appl. No.: 11/690,602

(22) Filed: Mar. 23, 2007

(51) Int. Cl.
*H04W 4/00* (2009.01)

(52) U.S. Cl. .......... 455/466; 455/414.1; 455/414.2; 455/418; 379/88.12

(58) Field of Classification Search .......... 455/466, 455/412.1, 412.2, 414.1, 418; 709/205, 206; 715/751; 379/88.12
See application file for complete search history.

(56) References Cited

U.S. PATENT DOCUMENTS

| | | | |
|---|---|---|---|
| 5,867,281 A * | 2/1999 | Nozoe et al. | 358/402 |
| 7,274,926 B1 * | 9/2007 | Laumen et al. | 455/414.1 |
| 7,353,034 B2 * | 4/2008 | Haney | 455/457 |
| 7,484,175 B2 * | 1/2009 | Kirkland | 715/751 |
| 7,769,144 B2 * | 8/2010 | Yao et al. | 379/88.13 |
| 7,930,354 B2 * | 4/2011 | Vuong et al. | 709/206 |
| 7,949,353 B2 * | 5/2011 | Pollock et al. | 455/466 |
| 7,954,124 B2 * | 5/2011 | Rambo | 725/43 |
| 8,000,457 B2 * | 8/2011 | Harper | 379/100.01 |
| 2002/0107930 A1 * | 8/2002 | Itoh | 709/206 |
| 2002/0144273 A1 * | 10/2002 | Reto | 725/86 |
| 2003/0080998 A1 * | 5/2003 | Gonzalez | 345/751 |
| 2003/0195950 A1 * | 10/2003 | Huang et al. | 709/219 |
| 2004/0111612 A1 * | 6/2004 | Choi et al. | 713/163 |
| 2004/0214609 A1 * | 10/2004 | Sagi et al. | 455/566 |
| 2005/0060374 A1 * | 3/2005 | Phillips | 709/206 |
| 2005/0064887 A1 * | 3/2005 | Bengtsson et al. | 455/466 |
| 2006/0067502 A1 * | 3/2006 | Bamrah et al. | 379/211.02 |
| 2006/0073812 A1 * | 4/2006 | Punaganti Venkata et al. | 455/412.1 |
| 2006/0084450 A1 * | 4/2006 | Dam Nielsen et al. | 455/466 |
| 2006/0155785 A1 * | 7/2006 | Berry et al. | 707/204 |
| 2007/0060206 A1 * | 3/2007 | Dam Nielsen et al. | 455/566 |
| 2007/0066283 A1 * | 3/2007 | Haar et al. | 455/412.2 |
| 2008/0132254 A1 * | 6/2008 | Graham et al. | 455/466 |
| 2008/0162649 A1 * | 7/2008 | Lee et al. | 709/206 |
| 2008/0216022 A1 * | 9/2008 | Lorch et al. | 715/847 |

* cited by examiner

*Primary Examiner* — Kamran Afshar
*Assistant Examiner* — Mong-Thuy Tran
(74) *Attorney, Agent, or Firm* — Fulbright & Jaworski, L.L.P.

(57) ABSTRACT

The present invention is directed to systems and methods for facilitating real-time instant messaging among a group of people. In one embodiment, the instant messages are clustered around a theme, such as a picture, a graphic or even bit mapped data. The common theme acts as a marker, and messages are accumulated around that marker for distribution to a group of people associated with that marker. In one embodiment, the messages are transient in nature and thus have no permanency in any database.

16 Claims, 2 Drawing Sheets

SYSTEMS AND METHODS FOR CONTROLLING GROUP MESSAGING

CROSS-REFERENCE TO RELATED APPLICATIONS

This patent application is related to concurrently filed, co-pending, and commonly-assigned: U.S. patent application Ser. No. 11/690,582, filed Mar. 23, 2007 and entitled "SYSTEMS AND METHODS FOR CONTROLLING APPLICATION UPDATES ACROSS A WIRELESS INTERFACE"; U.S. patent application Ser. No. 11/690,591, filed Mar. 23, 2007 and entitled "SYSTEMS AND METHODS FOR COORDINATING THE UPDATING OF APPLICATIONS ON A COMPUTING DEVICE;" the disclosures of which are incorporated herein by reference.

TECHNICAL FIELD

This disclosure relates to electronic messaging systems and more particularly to systems and methods for controlling group messaging.

BACKGROUND OF THE INVENTION

With the widespread availability of electronic networks came the advent of electronic mail (e-mail). Communication phenomenon in the digital world has gone from e-mail to instant messaging to chat. Text messaging, especially among mobile device users, is now extremely popular. Messaging formats tend to be point to point and sequential in nature. Thus, when a soccer coach needs to inform the team that a game is delayed an hour, the coach must either use an e-mail system where he/she has a pre-defined list or must text message each player individually.

The problem is compounded when a group of people are trying to decide on a movie or where to meet for dinner. Each has an idea of what he/she would like to see, and it would be nice if each could see the comments of the others without resorting to e-mail accounts.

BRIEF SUMMARY OF THE INVENTION

The present invention is directed to systems and methods for facilitating real-time instant messaging among a group of people. In one embodiment, the instant messages are clustered around a theme, such as a picture, a graphic or even bit mapped data. The common theme acts as a marker, and messages are accumulated around that marker for distribution to a group of people associated with that marker. In one embodiment, the messages are transient in nature and thus have no permanency in any database.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
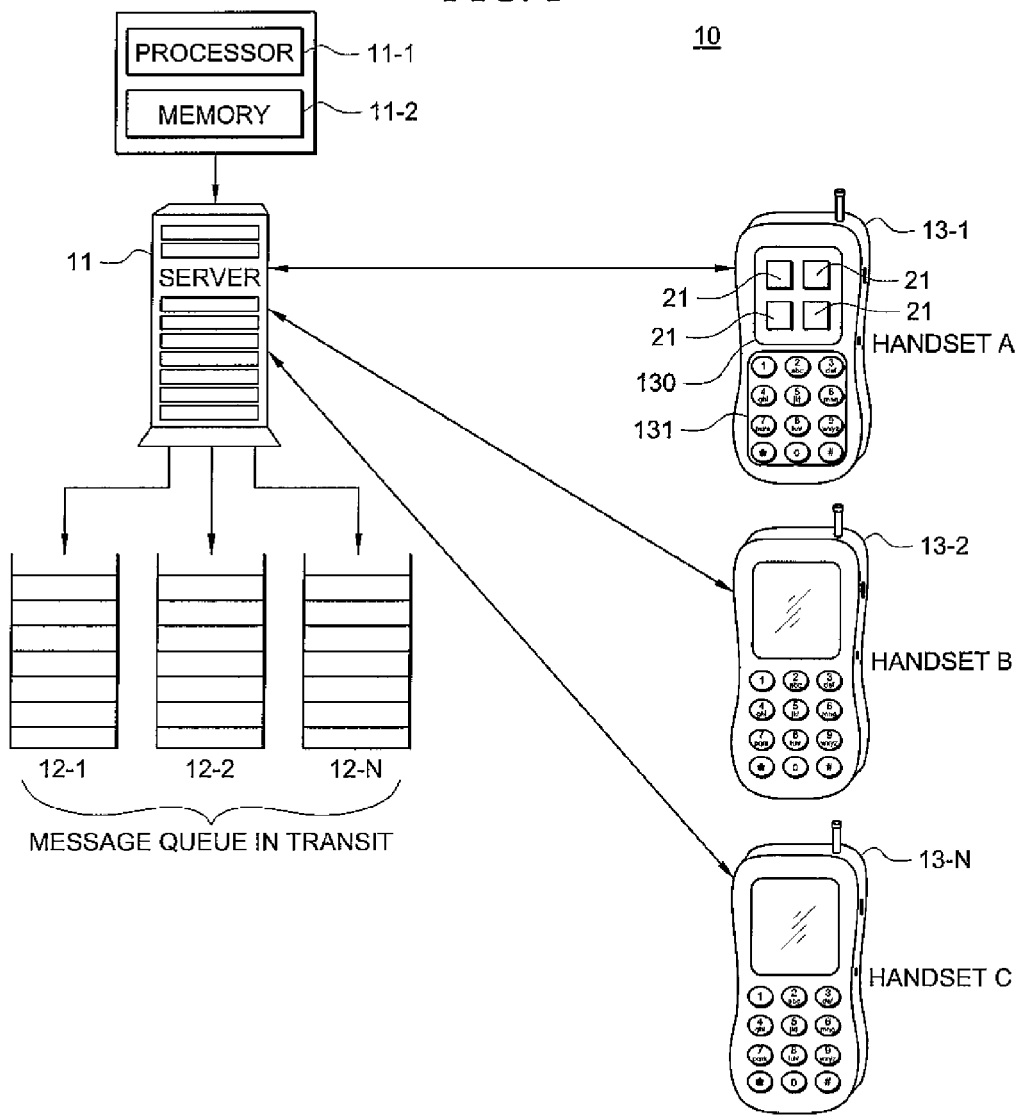
FIG. 1 shows one embodiment of a system for controlling the association of a common theme with messages for delivery to devices.

FIG. 1 shows one embodiment 10 of a system for controlling the association of information with messages for delivery to devices, such as to devices 13-1 to 13-N. Devices 13-1 to 13N can be any type of device capable of handling electronic communication whether wireline or wireless. In one embodiment, these devices can be cellular telephones interacting with server 11.

Server 11 maintains a number of message queues, 12-1 to 12N that correspond to messages that are to be delivered to or which have come from a particular device. As shown, the messages in queue 12-1 are associated with device 13-1, etc. The message queue is in one embodiment, a directory, or directories, on a file server, stored, for example, in memory 11-2 under control of processor 11-1. The server runs an application (not shown) which controls the addressing. Thus, when a message is sent from device 13-1 to any other device (such as to device 13-2 or 13-N), the server will copy that message into the appropriate message queue for the proper recipient. For example, if a message is sent from device 13-1 to device 13-2 and to device 13-N, the server will take that message and copy the message into the message queue for devices 13-2 and 13-N. Message queues 12-1 through 12-N represent messages in transit and when they are received by the respective device, they are then taken out of the queue and only then exist on the respective devices. Thus, these messages are not persistent.

Figure 2:
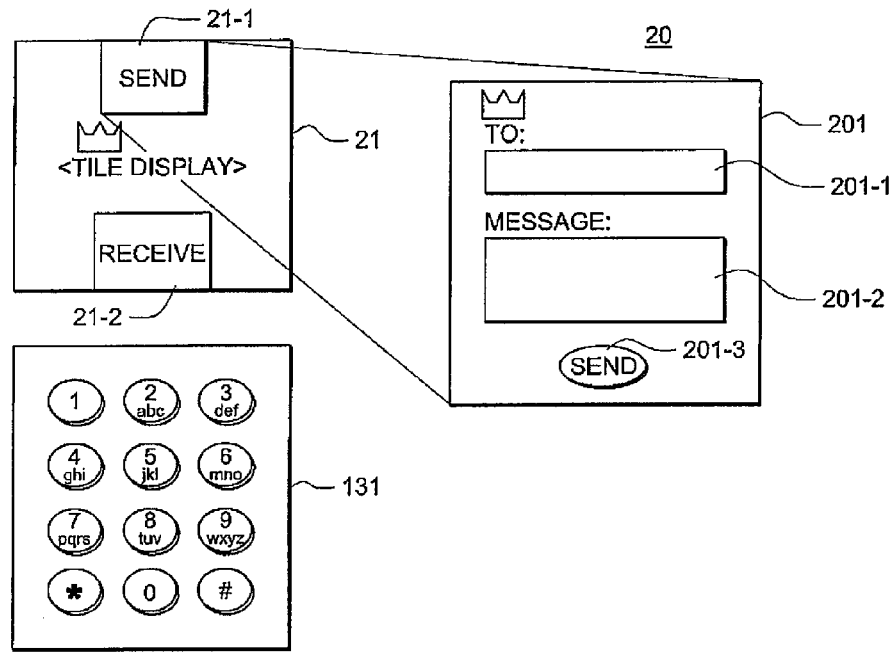
FIG. 2 illustrates one embodiment of a user's display showing a message tile in preparation for sending.

FIG. 2 illustrates one embodiment 20 of a user's display showing a message tile, such as tile 21 in preparation for sending a message. Tile 21 is a visual image of something; a picture, a graphic, a video, anything that can be displayed. In the example, tile 21 carries the fanciful image of a crown. This image then becomes the marker around which messages can become temporarily associated. When the user selects tile 21, perhaps by pressing button S (21-1) on the top of the display, the tile zooms or enlarges as shown by tile 201.

In the expanded view of tile 201, there is now shown (in association with the image of the crown) a TO: box 201-1 and a MESSAGE: box 201-2 and a SEND button 201-3. The user would enter the intended message recipients by either phone numbers or a special ID (called herein the ZZID). The user then adds, by typing, voice activation, pasting of a file, etc, a message. When the message is entered, send button 201-3 becomes enabled.

When the user presses the send button, a snapshot of the image of tile 21 is taken. The snapshot, together with the attached message is sent to server 11, together with the list of desired recipients. As discussed with respect to FIG. 1, the message is then copied into the corresponding in-box for the desired recipients.

Figure 3:
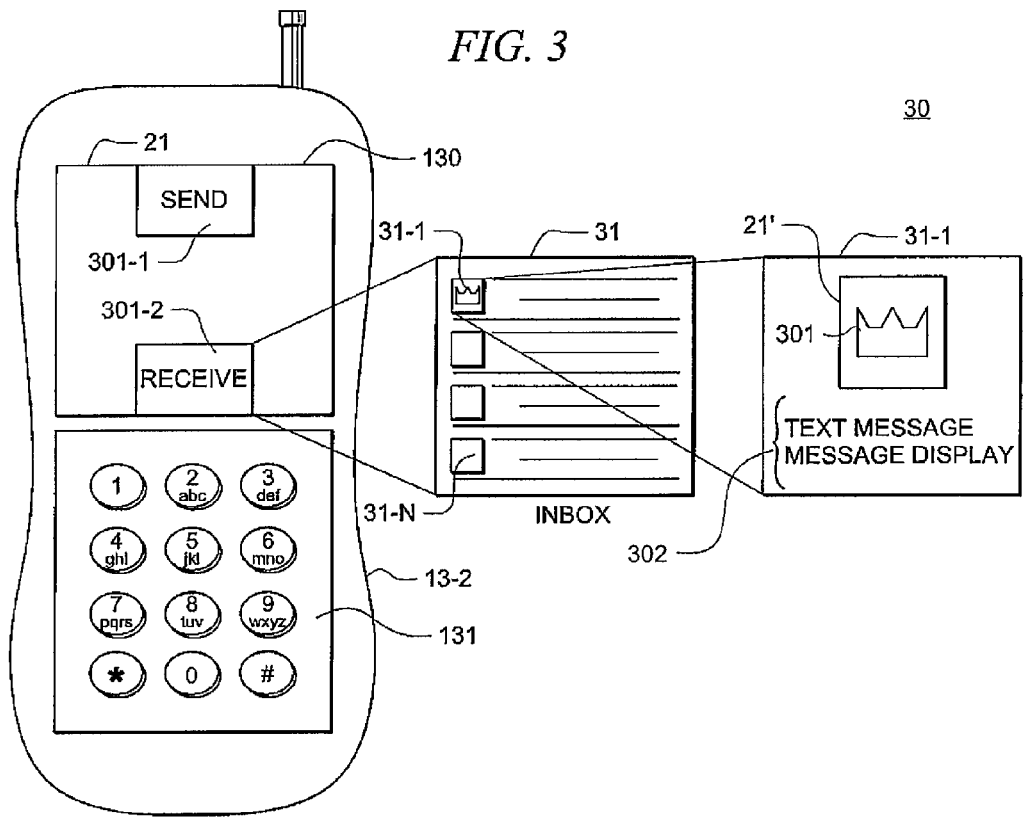
FIG. 3 illustrates one embodiment of a user's display showing the arrival of a message, all in accordance with one aspect of the invention.

FIG. 3 illustrates one embodiment 30 of a user's display, such as display 130 on device 13-2 showing the arrival of a message, all in accordance with one aspect of the invention. When the message tile arrives, the user is notified, for example, by flashing receive light 301-2. When the user touches that light (or otherwise signals that he/she desires to see the available messages) the message display expands, as shown by display 31, such that all available messages are listed, each associated with a marker image. In this example, image 31-1 shows that the crown marker has arrived. This then tells the user that the chain of messages associated with the crown has a new message for the user. By touching the image (or otherwise signifying that the user desires to see the message) message 31-1 expands as shown by image 21' and message 302 is visible.

Note that in view 31 of FIG. 3 several message threads appear, each associated with a different marker. Each marker can have a different group of users associated therewith, and this user set changes with each message chain that is created. If desired, some markers can have permanent users assigned, such that, for example, a soccer ball can have only the soccer team associated therewith.

Note that while we have been discussing the marker as a picture, etc, the marker can be an application. Thus, when the marker arrives, the application associated with the marker also arrives and is then usable by the recipient device. Thus, the code that arrives with the message can be loaded onto the recipient device under control of the recipient user. Note that the code could be music, a file, or an application usable from the device. These applications then can be easily exchanged between users.

Each of the recipient users then could reply to the message and the reply would go back to server 11 and then copied for delivery to each of the other users and to any new user added by any of the original recipient users.

In some situations, a designated recipient might not have the facility on his/her device to handle the messaging. In such a case, server 11 would know this and could, if desired, either download, or offer to download, the application so that the recipient is able to open and respond to his/her group messages. In one embodiment, the operations in the device are controlled by machine executable code running under control of, for example, processor 11-1.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for distributing messages to a group of users, said method comprising:
    attaching a message to a user selected marker at a first device, said attaching being under control of a first user at said first device;
    associating with said marker addresses of one or more target users;
    causing said marker, together with said attached message, to be digitally sent to an electronic network for delivery by said electronic network to all of said target users, each said target user being located at a respective device remote from said first device;
    displaying a received marker to a user of a device at which a marker has been received indicating that said marker has been received;
    under selective control of said user, making available to said user any message attached to said marker by a sending user;
    at said marker receiving device, allowing said marker receiving user to create an answer message in association with said received marker; and
    at said marker receiving device, using said marker, to control digitally sending said answer message to an electronic network for delivery by said electronic network to all of said target users in addition to said user at said first device.

2. The method of claim 1 wherein said marker is selected from the list of:
    picture files, audio files, application files, bitmapped files, video files, graphics files.

3. The method of claim 2 wherein at least some of said markers have pre-associated therewith a group of target users.

4. The method of claim 1 wherein when said marker is an application, making said application available for controlling operation aspects of a receiving device.

5. The method of claim 1 wherein said message associated with said marker resides only temporarily on devices at which said message is received and wherein said messages does not reside anywhere else in said network.

6. The method of claim 1 wherein said marker causing comprises:
    sending said marker and said attached message to a server and wherein said server copies said marker and said attached messages for distribution to said target users.

7. A system for message distribution, said system comprising:
    a server accessible by a plurality of wireless devices,
    said server storing at least one message from a wireless device, said message having associated therewith a marker selected by a message sender,
    said server operative for controlling the communication of any marker received at said server from a particular one of said devices to a plurality of other devices identified in conjunction with said marker;
    a plurality of devices for allowing a user of each said device to provide an answer to a message associated with said received marker;
    control associated with each said device and responses, at least in part to said marker for delivering said answer to said server together with said marker;
    wherein said server is further operative for distributing said answer to all of said identified users; and a display at all of said devices operable upon receipt of a communicated marker thereto for indicating to a user of said device that a marker has been delivered, and for displaying to said user said message associated with said marker.

8. The system of claim 7 further comprising:

means at each of said devices for removing from said device any received message after said answer message is delivered to said server.

9. The system of claim 7 wherein said marker is selected from the list of:

picture files, audio files, application files, bitmapped files, video files, graphics files.

10. A method performed by a machine controllable code for use in mobile wireless device, said method comprising code operable for:

allowing a user of each said device to associate at least one outgoing message and at least one target address with a selected marker;

controlling delivery of a selected marker, together with a message and said associated address locations, to a server for subsequent delivery to said address location;

indicating to a user of said device that a marker has been delivered;

displaying any message associated with said marker to said user in response to a request from said user;

allowing a user to provide an answer to a message associated with a received marker; and controlling under at least partial control of said marker delivery of said received marker, together with said answer message to said server for subsequent delivery to a marker sending device as well as all of said address locations.

11. The method code of claim 10 further comprising operable for:

removing from said device any received message after said answer message is delivered to said server.

12. The method code of claim 10 wherein said marker is selected from the list of:

picture files, audio files, application files, bitmapped files, video files, graphics files.

13. A system for message distribution, said system comprising:

an operating system for making available on a wireless device selectable markers;

said operating system further operable for allowing a user thereof to associate at least one message and at least one address location with a selected one of said markers; and wherein said operating system is further operable for delivering to a remote server any marker having a message associated therewith, said remote server in turn operable under at least partial control of said marker for controlling the communication of any marker delivered thereto to other wireless devices in accordance with said associated address locations; and wherein said wireless devices have displays for indicating to a user a received marker together with any message associated with said received message.

14. The system of claim 13 wherein said markers are selected from the list of:

picture files, audio files, application files, bitmapped files, video files, graphics files.

15. The system of claim 14 wherein an operating system at a device in receipt of a marker is operable for allowing a user to provide an answer to a message associated with said received marker, said answer distributed to all said associated address locations.

16. The system of claim 15 wherein said operating systems are operable for removing from said device any received message after said answer message is delivered to said server.

* * * * *